(12) United States Patent
Harada et al.

(10) Patent No.: US 12,131,853 B2
(45) Date of Patent: Oct. 29, 2024

(54) APPARATUS FOR MANUFACTURING ROTOR, METHOD OF MANUFACTURING ROTOR, AND ROTOR

(71) Applicant: DENSO CORPORATION, Kariya (JP)

(72) Inventors: Masaru Harada, Kariya (JP); Ritsurou Hiramatsu, Kariya (JP); Toshihiro Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 219 days.

(21) Appl. No.: 17/954,061

(22) Filed: Sep. 27, 2022

(65) Prior Publication Data

US 2023/0017419 A1 Jan. 19, 2023

Related U.S. Application Data

(63) Continuation of application No. PCT/JP2021/013320, filed on Mar. 29, 2021.

(30) Foreign Application Priority Data

Mar. 30, 2020 (JP) ................................. 2020-060871
Feb. 17, 2021 (JP) ................................. 2021-023504

(51) Int. Cl.
*H01F 13/00* (2006.01)
*H02K 1/18* (2006.01)
*H02K 15/03* (2006.01)

(52) U.S. Cl.
CPC ............. *H01F 13/003* (2013.01); *H02K 1/18* (2013.01); *H02K 15/03* (2013.01)

(58) Field of Classification Search
CPC ......... H01F 13/003; H02K 1/18; H02K 15/03
See application file for complete search history.

(56) References Cited

U.S. PATENT DOCUMENTS

| 2016/0111945 A1* | 4/2016 | Yamaguchi | H02K 15/03 29/598 |
| 2017/0187255 A1* | 6/2017 | Kanda | H02K 1/2766 |
| 2017/0279340 A1* | 9/2017 | Takeuchi | H02K 1/272 |

FOREIGN PATENT DOCUMENTS

| JP | 2016-82778 A | 5/2016 |
| JP | 2016-144322 A | 8/2016 |

* cited by examiner

*Primary Examiner* — Mohamad A Musleh
(74) *Attorney, Agent, or Firm* — Oliff PLC

(57) ABSTRACT

An apparatus for manufacturing a rotor includes a magnetizer. The magnetizer is configured to magnetize a permanent magnet in a rotor from outside the rotor. The rotor includes a rotor core having a magnet insertion hole. The permanent magnet is provided in an embedded state in the magnet insertion hole and has a bent-back shape protruding radially inward. The magnetizer includes a first yoke portion, a second yoke portion, and a magnetization coil. The first yoke portion has an opposing portion facing an outer peripheral surface of the rotor. The second yoke portion forms a magnetic path together with the first yoke portion. The magnetization coil is disposed on the magnetic path of the first and second yoke portions. The magnetizer magnetizes the permanent magnet by energizing the magnetization coil to apply a magnetizing magnetic flux at least through the rotor between the first yoke portion and the second yoke portion, which are located opposed to each other in a radial direction of the rotor.

10 Claims, 11 Drawing Sheets

APPARATUS FOR MANUFACTURING ROTOR, METHOD OF MANUFACTURING ROTOR, AND ROTOR

CROSS-REFERENCE TO RELATED APPLICATION

This application is the U.S. bypass application of International Application No. PCT/JP2021/013320 filed on Mar. 29, 2021 which designated the U.S. and claims priority to Japanese Patent Application No. 2020-060871 filed on Mar. 30, 2020 and Japanese Patent Application No. 2021-023504 filed on Feb. 17, 2021, the contents of all of which are incorporated herein by reference.

TECHNICAL FIELD

The present disclosure relates to an apparatus for manufacturing a magnet-embedded type rotor configured to perform magnetization of permanent magnets in an embedded state from outside the rotor, a method of manufacturing the rotor, and the rotor.

BACKGROUND

Rotary electric machines using a magnet-embedded type (IPM type) rotor have been well known. The magnet-embedded type rotors have a configuration in which permanent magnets are internally embedded in the rotor core and a reluctance torque is generated at a portion of the rotor core radially outside the permanent magnets. In such magnet-embedded type rotors, magnetization of the rotor core having unmagnetized permanent magnets in an embedded state may be performed from the outer circumferential side using a magnetizer (see e.g., JP 2016-144322 A).

SUMMARY

According to a first aspect of the present disclosure, an apparatus for manufacturing a rotor includes a magnetizer configured to magnetize a permanent magnet in the rotor from outside the rotor. The rotor includes a rotor core having a magnet insertion hole. The permanent magnet is provided in an embedded state in the magnet insertion hole and has a bent-back shape protruding radially inward. The magnetizer includes a first yoke portion, a second yoke portion, and a magnetization coil. The first yoke portion has an opposing portion facing an outer peripheral surface of the rotor. The second yoke portion forms a magnetic path together with the first yoke portion, and includes an insertion part or a connection part, the insertion part being configured to be inserted into a shaft insertion hole of the rotor before a rotary shaft is inserted, and the connection part being configured to be magnetically connected to the rotary shaft inserted in the shaft insertion hole of the rotor. The magnetization coil is disposed on the magnetic path of the first and second yoke portions. The magnetizer is configured to magnetize the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

According to a second aspect of the present disclosure, a method of manufacturing a rotor uses a magnetizer. The magnetizer is configured to magnetize a permanent magnet in a rotor from outside the rotor. The rotor includes a rotor core having a magnet insertion hole. The permanent magnet is provided in an embedded state in the magnet insertion hole and has a bent-back shape protruding radially inward. The magnetizer includes a first yoke portion, a second yoke portion, and a magnetization coil. The first yoke portion has an opposing portion facing an outer peripheral surface of the rotor. The second yoke portion forms a magnetic path together with the first yoke portion, and includes an insertion part or a connection part, the insertion part being configured to be inserted into a shaft insertion hole of the rotor before a rotary shaft is inserted, and the connection part being configured to be magnetically connected to the rotary shaft inserted in the shaft insertion hole of the rotor. The magnetization coil is disposed on the magnetic path of the first and second yoke portions. The method includes magnetizing the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

According to a third aspect of the present disclosure, a rotor includes a rotor core and a permanent magnet. The rotor core has a magnet insertion hole. The permanent magnet is provided in an embedded state in the magnet insertion hole and has a bent-back shape protruding radially inward. The rotor is configured with the permanent magnet in the embedded state magnetized using a magnetizer from outside the rotor. When a length between positions where extension lines of inner sides of the bent-back shape of the permanent magnet intersect an outer peripheral surface of the rotor core is defined as a magnetic pole pitch, and a length from the outer peripheral surface of the rotor core to an inner side of the bent portion of the permanent magnet on a circumferential center line of the permanent magnet is defined as an embedding depth, the permanent magnet has a deep folded shape, in which the embedding depth is larger than the magnetic pole pitch. When an inflection point at which a change in magnetic field strength due to magnetization of the permanent magnet becomes gradual is defined as a desired lower limit, the permanent magnet is magnetized such that a region of the permanent magnet magnetized at a magnetic field strength exceeding the desired lower limit is more than 90%.

BRIEF DESCRIPTION OF THE DRAWINGS

The above features of the present disclosure will become apparent from the following detailed description with reference to the accompanying drawings. In the accompanying drawings.

DETAILED DESCRIPTION OF THE PREFERRED EMBODIMENTS

Figure 1:
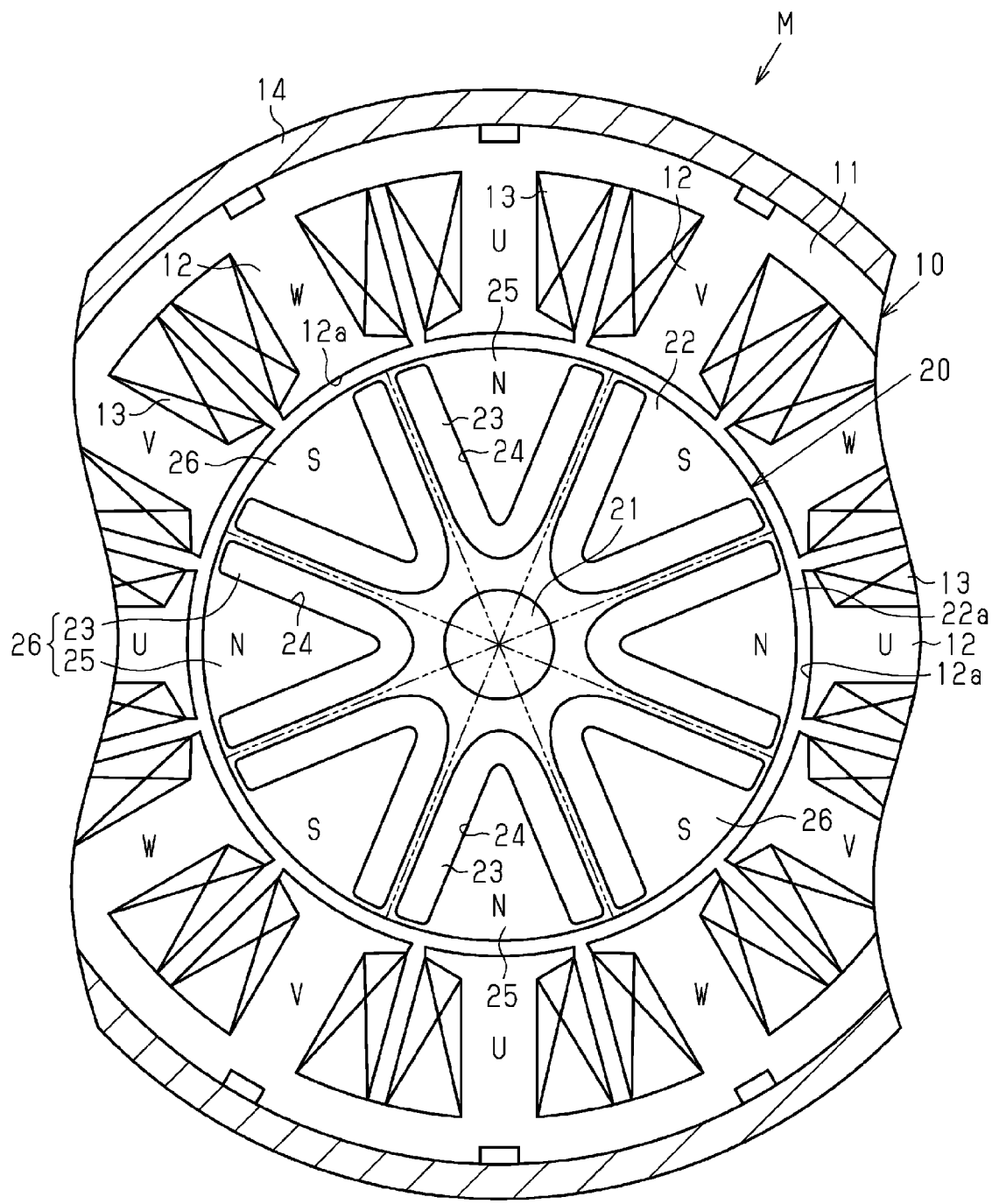
FIG. 1 is a configuration diagram of a rotary electric machine having a magnet-embedded type rotor.

One of the solutions to improve the performance of the magnet-embedded type rotor is to increase the reluctance torque by forming a permanent magnet into a substantially V- or U-shaped bent-back shape to increase the portion of the rotor core radially outside the permanent magnet.

In order to increase the portion of the rotor core radially outside the permanent magnet, a permanent magnet can be formed in a deeply bent shape so that a bent portion which is a bent-back portion of the permanent magnet is located more radially inward. The more the bent-back portion of the permanent magnet is located radially inward, the farther away the permanent magnet, in particular, the bent portion and the vicinity of the bent portion, is located from the magnetizer. Therefore, there is a concern whether the bent portion and the vicinity of the bent portion of the permanent magnet which are portions farther from the magnetizer are magnetized with a sufficient magnetic force.

The present disclosure is directed to provide an apparatus for manufacturing a rotor capable of magnetizing permanent magnets embedded in a rotor core with a high magnetic force, a method of manufacturing a rotor, and a rotor to which the magnetization is applied.

According to a first aspect of the present disclosure, an apparatus for manufacturing a rotor includes a magnetizer configured to magnetize a permanent magnet in the rotor from outside the rotor. The rotor includes a rotor core having a magnet insertion hole. The permanent magnet is provided in an embedded state in the magnet insertion hole and has a bent-back shape protruding radially inward. The magnetizer includes a first yoke portion, a second yoke portion, and a magnetization coil. The first yoke portion has an opposing portion facing an outer peripheral surface of the rotor. The second yoke portion forms a magnetic path together with the first yoke portion, and includes an insertion part or a connection part, the insertion part being configured to be inserted into a shaft insertion hole of the rotor before a rotary shaft is inserted, and the connection part being configured to be magnetically connected to the rotary shaft inserted in the shaft insertion hole of the rotor. The magnetization coil is disposed on the magnetic path of the first and second yoke portions. The magnetizer is configured to magnetize the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

According to a second aspect of the present disclosure, a method of manufacturing a rotor uses a magnetizer. The magnetizer is configured to magnetize a permanent magnet in a rotor from outside the rotor. The rotor includes a rotor core having a magnet insertion hole. The permanent magnet is provided in an embedded state in the magnet insertion hole and has a bent-back shape protruding radially inward. The magnetizer includes a first yoke portion, a second yoke portion, and a magnetization coil. The first yoke portion has an opposing portion facing an outer peripheral surface of the rotor. The second yoke portion forms a magnetic path together with the first yoke portion, and includes an insertion part or a connection part, the insertion part being configured to be inserted into a shaft insertion hole of the rotor before a rotary shaft is inserted, and the connection part being configured to be magnetically connected to the rotary shaft inserted in the shaft insertion hole of the rotor. The magnetization coil is disposed on the magnetic path of the first and second yoke portions. The method includes magnetizing the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

According to the above apparatus for manufacturing a rotor and the above method of manufacturing a rotor, when magnetization of the permanent magnet in an embedded state in the rotor is performed from outside the rotor using the magnetizer, magnetization is performed by applying a magnetizing magnetic flux at least through the rotor between the opposing portion of the first yoke portion and the insertion part of the second yoke portion inserted in the shaft insertion hole before the rotary shaft is inserted, or the rotary shaft inserted in the shaft insertion hole of the rotor and magnetically connected to the second yoke portion, which are located opposed to each other in a radial direction of the rotor. That is, although the bent portion and the vicinity of the bent portion of the permanent magnet having a bent-back shape protruding radially inward are located at positions where a magnetizing magnetic flux is difficult to reach in conventional magnetization performed from the outer circumferential side, the above magnetization method can supply a sufficient magnetizing magnetic flux to the bent portion and the vicinity of the bent portion of the permanent magnet. Accordingly, the entire permanent magnet can be magnetized with a sufficient magnetic force.

According to a third aspect of the present disclosure, a rotor includes a rotor core and a permanent magnet. The rotor core has a magnet insertion hole. The permanent magnet is provided in an embedded state in the magnet insertion hole and has a bent-back shape protruding radially inward. The rotor is configured with the permanent magnet in the embedded state magnetized using a magnetizer from outside the rotor. When a length between positions where extension lines of inner sides of the bent-back shape of the permanent magnet intersect an outer peripheral surface of the rotor core is defined as a magnetic pole pitch, and a length from the outer peripheral surface of the rotor core to an inner side of the bent portion of the permanent magnet on a circumferential center line of the permanent magnet is defined as an embedding depth, the permanent magnet has a deep folded shape, in which the embedding depth is larger than the magnetic pole pitch. When an inflection point at which a change in magnetic field strength due to magnetization of the permanent magnet becomes gradual is defined as a desired lower limit, the permanent magnet is magnetized such that a region of the permanent magnet magnetized at a magnetic field strength exceeding the desired lower limit is more than 90%.

In the rotor having the permanent magnet having a deep folded shape, in which the embedding depth is larger than the magnetic pole pitch, the bent portion and the vicinity of the bent portion of the permanent magnet are located at positions where a magnetizing magnetic flux is difficult to reach. However, according to the above apparatus for manufacturing a rotor and the method of manufacturing a rotor, the entire permanent magnet can be magnetized with a sufficient magnetic force. In this case, when an inflection point at which a change in magnetic field strength due to magnetization of the permanent magnet becomes gradual is defined as a desired lower limit, a region of the permanent magnet of the rotor magnetized at a magnetic field strength exceeding the desired lower limit can be more than 90% (see e.g., FIG. 10).

The following description will be given of an embodiment of an apparatus for manufacturing a rotor, a method of manufacturing a rotor, and a rotor.

A rotary electric machine M of the present embodiment shown in FIG. 1 is configured with a magnet-embedded type brushless motor. The rotary electric machine M includes a substantially annular stator 10 and a substantially cylindrical rotor 20 rotatably disposed in a space radially inside the stator 10.

The stator 10 includes a substantially annular stator core 11. The stator core 11 is formed of a magnetic metal material, for example, by laminating a plurality of electromagnetic steel sheets in the axial direction. The stator core 11 in the present embodiment includes twelve teeth 12 disposed at equal intervals in the circumferential direction and extending radially inward. The respective teeth 12 have the same shape. The tooth 12 has a radially inner end having a substantially T-shape whose end face 12a has an arc shape that follows the outer peripheral surface of the rotor 20. A winding 13 is wound around the tooth 12 in concentrated winding. The windings 13 are connected in a three-phase arrangement, and function as U-phase, V-phase and W-phase, as shown in FIG. 1. When power is supplied to the windings 13, a rotating magnetic field for rotationally driving the rotor 20 is generated in the stator 10. In such a stator 10, the outer peripheral surface of the stator core 11 is fixed to the inner peripheral surface of a housing 14.

The rotor 20 includes a rotary shaft 21, a substantially cylindrical rotor core 22 in which the rotary shaft 21 is inserted in the center portion, and permanent magnets 23. In the present embodiment, eight permanent magnets 23 are embedded in the rotor core 22. The rotor core 22 is formed of a magnetic metal material, for example, by laminating a plurality of electromagnetic steel sheets in the axial direction. The rotary shaft 21 is supported on a bearing (not shown) provided in the housing 14 so that the rotor 20 is rotatably disposed in the stator 10.

The rotor core 22 has magnet insertion holes 24 for receiving the permanent magnets 23. In the present embodiment, eight magnet insertion holes 24 are arranged at equal intervals in the circumferential direction of the rotor core 22. Each magnet insertion hole 24 has a substantially V-shape bent to protrude radially inward, and all the magnet insertion holes 24 have the same shape. The magnet insertion holes 24 extend over the entire axial length of the rotor core 22.

The permanent magnet 23 of the present embodiment is made of a bonded magnet obtained by molding and solidifying a magnet material in which magnet powder is mixed with a resin. That is, the permanent magnet 23 is formed by using the magnet insertion hole 24 in the rotor core 22 as a mold, filling the magnet insertion hole 24 with an unsolidified magnet material without a gap by injection molding, and solidifying the injected magnet material in the magnet insertion hole 24. Therefore, the shape of the magnet insertion hole 24 is the outer shape of the permanent magnet 23.

Examples of the magnet powder used for the permanent magnet 23 of the present embodiment include a samarium-iron-nitrogen (SmFeN) magnet, but other rare earth magnets may also be used.

Figure 2:
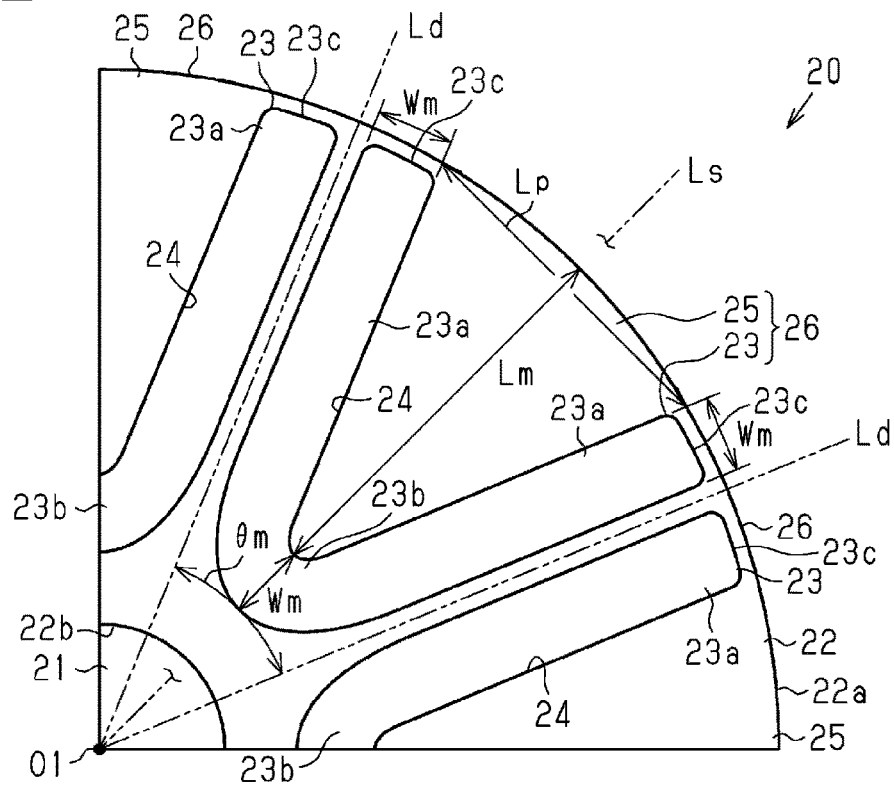
FIG. 2 is a configuration diagram of a rotor.

The permanent magnet 23 has a substantially V-shape bent to protrude radially inward. More specifically, as shown in FIG. 2, the permanent magnet 23 includes a pair of straight portions 23a with their radially inner ends connected to each other, forming a bent portion 23b. The straight portions 23a has a radially outer end 23c located in proximity to an outer peripheral surface 22a of the rotor core 22. In the permanent magnet 23, a thickness Wm is constant over the entire V-shaped path including the pair of straight portions 23a and the bent portion 23b. The permanent magnet 23 has a shape line-symmetrical about its circumferential center line Ls passing through an axial center O1 of the rotor 20, and is located close to magnetic pole boundaries Ld passing through the axial center O1 of the rotor 20 between adjacent permanent magnets 23. An angle between the adjacent magnetic pole boundaries Ld, that is, a magnetic pole opening angle θm of a rotor magnetic pole portion 26 including the permanent magnet 23 is 180° in electrical angle.

Figure 3:
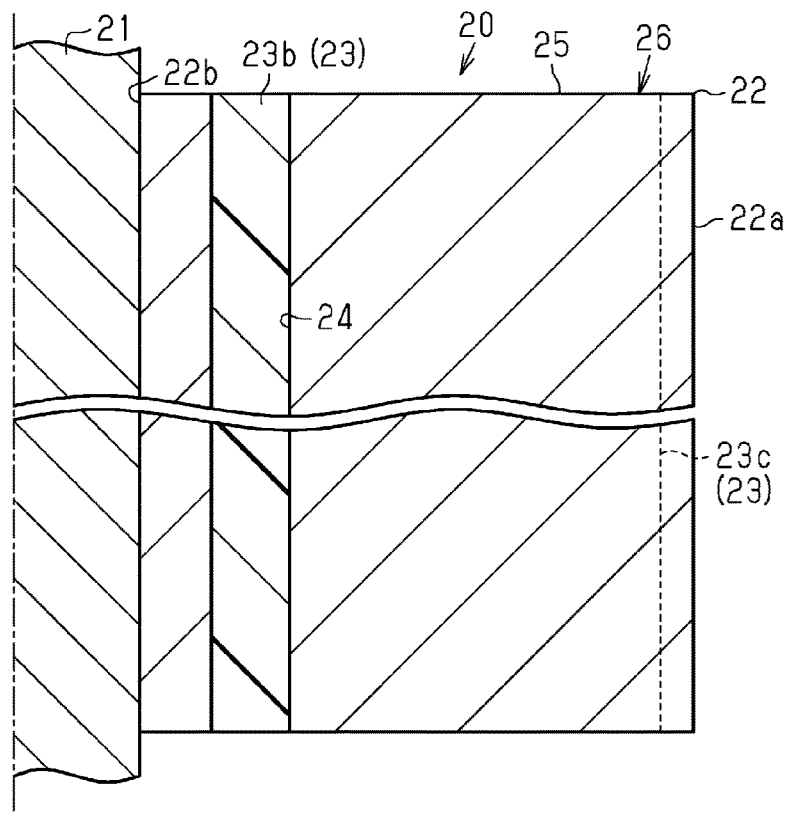
FIG. 3 is a cross-sectional view of a rotor.

Further, when a length between positions where extension lines of the inner sides of the straight portions 23a of the permanent magnet 23 intersect the outer peripheral surface 22a of the rotor core 22 is defined as a magnetic pole pitch Lp, and a length from the outer peripheral surface 22a of the rotor core 22 to the inner side of the bent portion 23b of the permanent magnet 23 on the circumferential center line Ls of the permanent magnet 23 is defined as an embedding depth Lm, the permanent magnet 23 of the present embodiment has a deep folded shape, in which the embedding depth Lm is larger than the magnetic pole pitch Lp. That is, as shown in FIGS. 2 and 3, the permanent magnets 23 of the present embodiment have a deep folded shape, in which the bent portion 23b is located radially inward close to a shaft insertion hole 22b in which the rotary shaft 21 is inserted in the center portion of the rotor core 22. The permanent magnets 23 extend over the entire axial length of the rotor core 22.

When the permanent magnets 23 are solidified in the magnet insertion holes 24 of the rotor core 22, the permanent magnets 23 in an unmagnetized state undergo magnetization so that they function as magnets. The magnetization is performed from outside the rotor core 22 using a magnetizer 30 shown in FIG. 4 and the like. Details of the magnetizer 30 and a magnetization method using the magnetizer 30 will be described later. In the present embodiment, eight permanent magnets 23 are disposed in the circumferential direction of the rotor core 22, and alternately magnetized to different polarities in the circumferential direction. Further, the respective permanent magnets 23 are magnetized in their thickness direction.

A portion of the rotor core 22 radially outward from the permanent magnet 23 and facing the stator 10 functions as an outer core portion 25 for obtaining reluctance torque. The rotor 20 of the present embodiment includes eight rotor magnetic pole portions 26. In the rotor 20, each rotor magnetic pole portion 26 includes the permanent magnet 23 and the outer core portion 25 surrounded by a substantially V-shape of each permanent magnet 23. As shown in FIG. 1, each rotor magnetic pole portion 26 functions as an N pole and an S pole alternately in the circumferential direction. In the rotor 20 having such rotor magnetic pole portions 26, a magnet torque and a reluctance torque are suitably obtained.

Next, an apparatus for manufacturing the rotor 20 and a method of manufacturing the rotor 20, including the magnetizer 30 for the permanent magnets 23 and a method of magnetizing the permanent magnets 23 using the magnetizer 30, will be described.

[Configuration of Magnetizer]

Figure 4:
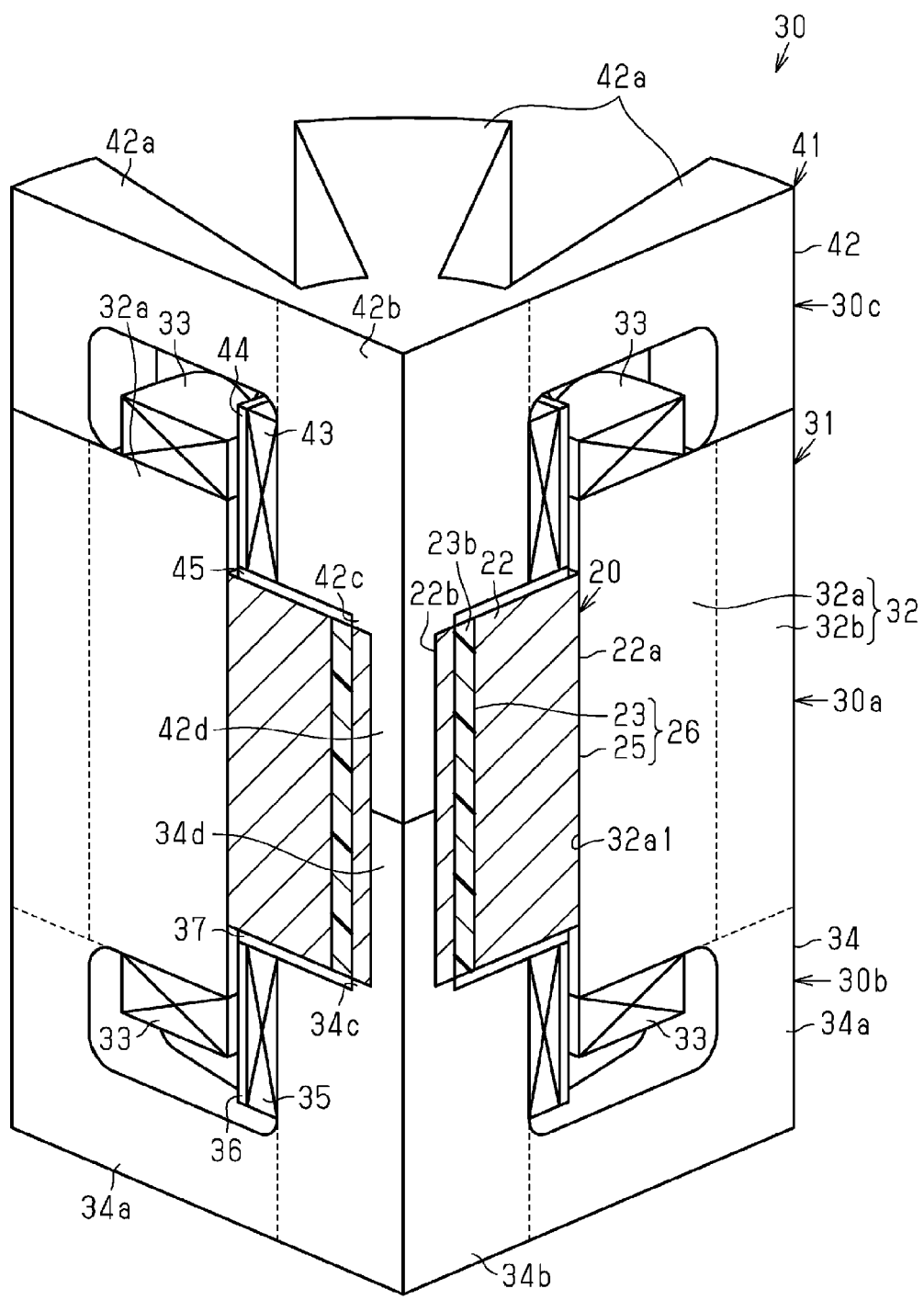
FIG. 4 is an explanatory view for explaining a configuration of a magnetizer according to an embodiment.
Figure 5:
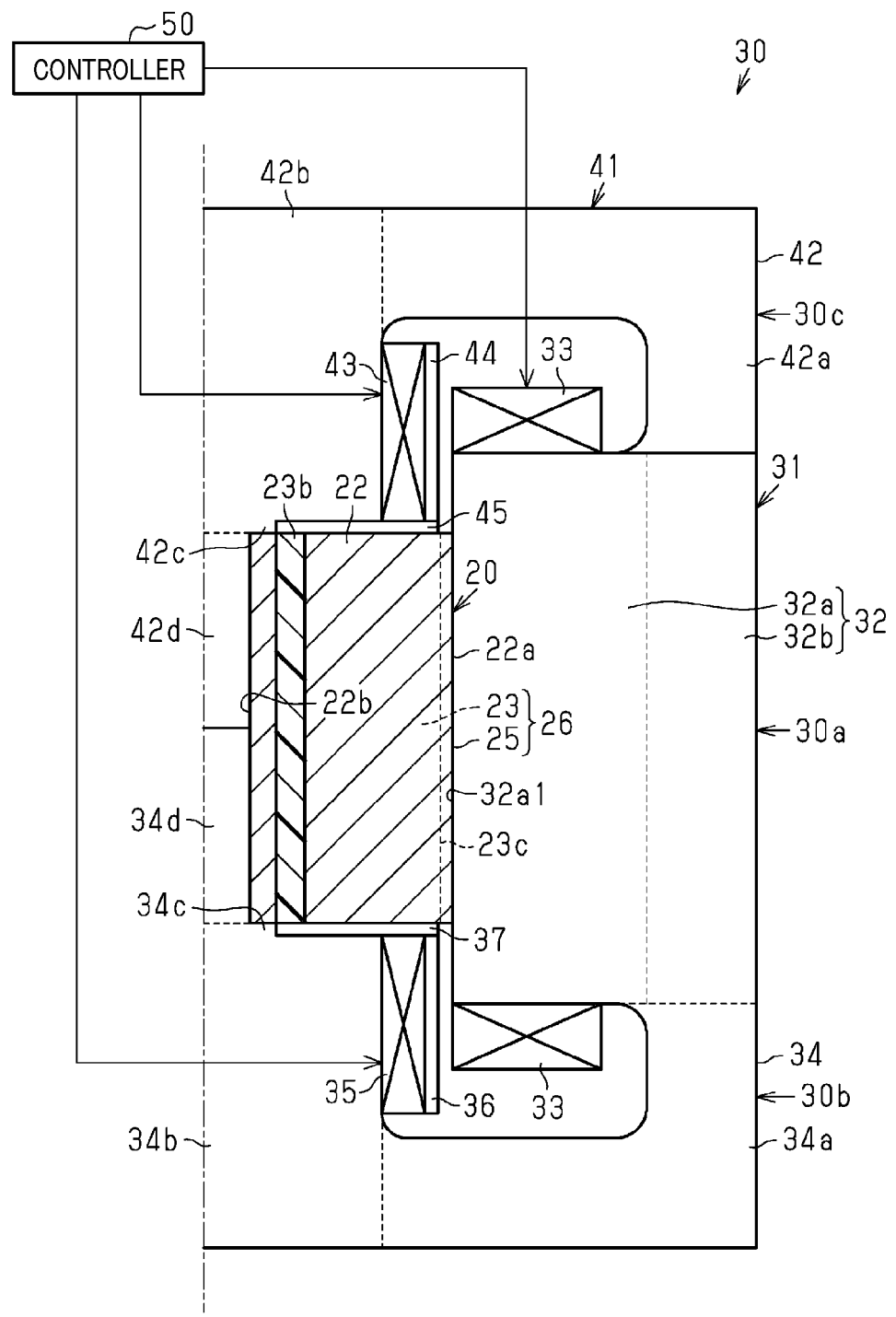
FIG. 5 is an explanatory view for explaining a configuration of the magnetizer of FIG. 4.
Figure 6:
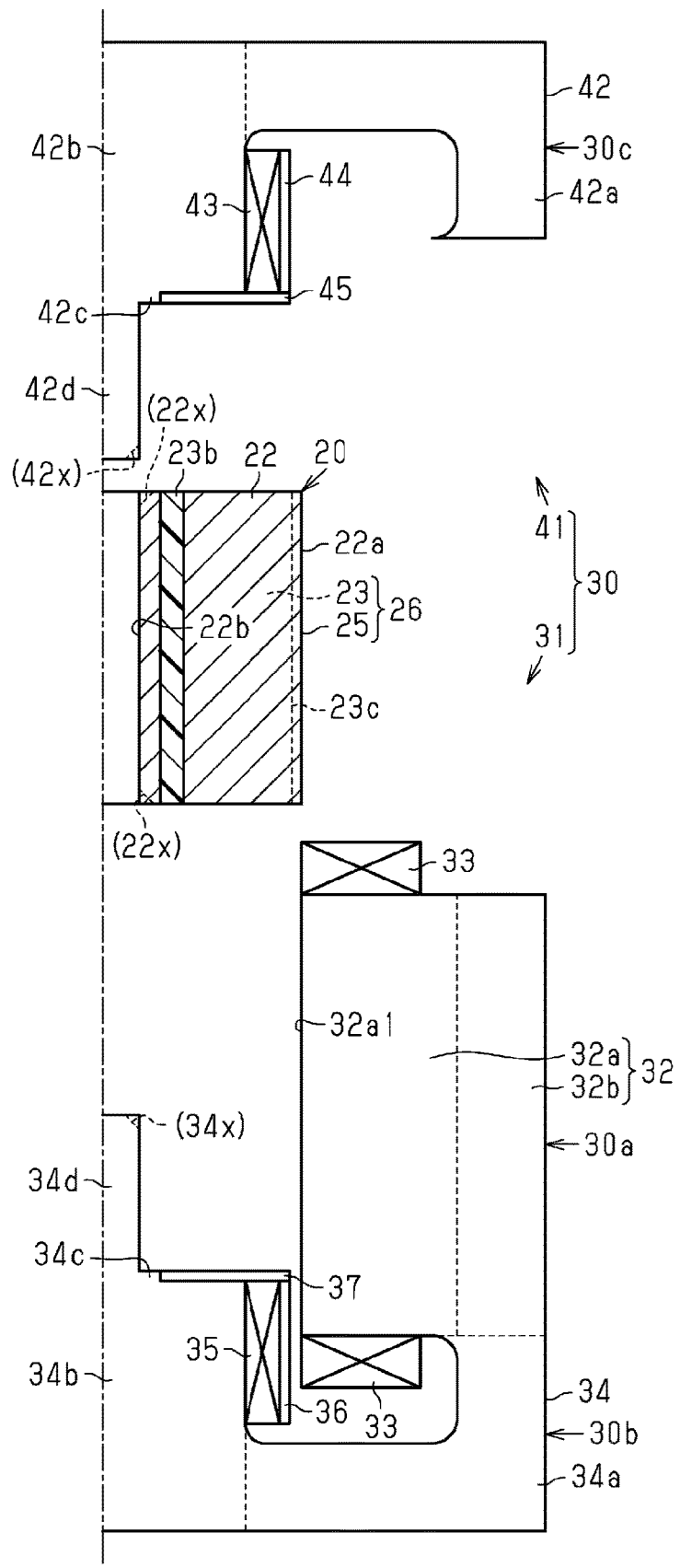
FIG. 6 is an explanatory view for explaining a configuration of the magnetizer of FIG. 4.

With reference to FIGS. 4, 5 and 6, the magnetizer 30 of the present embodiment will be described. In FIGS. 4 to 6, hatching of the cross-section is omitted as appropriate. Further, in FIG. 6, the rotor 20 is shown as a cross-section, and the magnetizer 30 is shown as an end face.

As shown in FIGS. 4 to 6, the magnetizer 30 includes a magnetizer main body (stationary portion) 31 and a magnetizer upper portion (movable portion) 41. The magnetizer upper portion 41 is detachably attached to the magnetizer main body 31 so that the rotor 20 to be magnetized can be installed and removed. It should be noted that the arrangement and operation mode of the magnetizer main body 31 and the magnetizer upper portion 41 are merely examples, and can be modified as appropriate.

The magnetizer main body 31 includes a main magnetization portion 30a and a lower auxiliary magnetization portion 30b integrally formed. The main magnetization portion 30a includes an outer circumferential side main yoke portion (first yoke portion) 32 made of a magnetic metal, and a main magnetization coil (magnetization coil, first magnetization coil) 33. The outer circumferential side main yoke portion 32 includes eight magnetizing opposing projections 32a (opposing portions) corresponding to the respective rotor magnetic pole portions 26 of the rotor 20 installed in the magnetizer 30. Each magnetizing opposing projection 32a has an end portion 32a1 on a radially inner end, and the end portion 32a1 is in proximity to and faces the outer peripheral surface 22a of the rotor 20 (rotor core 22) in the radial direction. The main magnetization coil 33 is wound around each magnetizing opposing projection 32a with a winding axis oriented in the radial direction. A radially outer peripheral portion of the outer circumferential side main yoke portion 32 constitutes an annular connecting portion 32b via which the magnetizing opposing projections 32a disposed at equal intervals in the circumferential direction are integrally connected in the circumferential direction (the annular shape of the annular connecting portion 32b is not shown).

The lower auxiliary magnetization portion 30b includes a lower auxiliary yoke portion (second yoke portion) 34 made of a magnetic metal, and a magnetizing lower auxiliary coil (magnetization coil, second magnetization coil) 35. The lower auxiliary yoke portion 34 includes eight lower connecting portions 34a corresponding to the respective magnetizing opposing projections 32a, and one lower joining portion 34b that joins the lower connecting portions 34a together. A first end of each lower connecting portion 34a is integrally connected to the underside of the annular connecting portion 32b of the outer circumferential side main yoke portion 32. The lower connecting portion 34a extends on the lower side of the main magnetization coil 33 and the like as viewed in the axial direction without interference therewith, and a second end of each lower connecting portion 34a is integrally connected to the lower joining portion 34b.

The lower joining portion 34b is located on the lower side of the rotor 20 installed in the magnetizer 30, and has a columnar shape extending in the axial direction of the rotor 20. The rotor 20 abuts a center portion of the top of the lower joining portion 34b. That is, the lower joining portion 34b has an abutment portion 34c configured to abut the rotor 20, and a lower insertion projection (insertion part, insertion projection) 34d located inside the abutment portion 34c and configured to be inserted from below into the shaft insertion hole 22b in the center portion of the rotor 20.

Further, the magnetizing lower auxiliary coil 35 is wound around the lower joining portion 34b with a winding axis oriented in the axial direction. A lower first regulation member (regulation member) 36 having a tubular shape made of a non-magnetic metal is mounted on the outer peripheral side of the magnetizing lower auxiliary coil 35, and a lower second regulation member (regulation member) 37 having a plate shape made of a non-magnetic metal is fixed to the lower joining portion 34b or the like on the upper side in the axial direction of the magnetizing lower auxiliary coil 35. The upper surfaces of the lower second regulation member 37 and the abutment portion 34c may be, for example, flush with each other. The regulation members 36 and 37 may be made of, for example, SUS. The regulation members 36 and 37 are provided to reduce bulging or displacement in winding of the magnetizing lower auxiliary coil 35 during energization in magnetization.

On the other hand, the magnetizer upper portion 41 detachably attached to the magnetizer main body 31 includes only the upper auxiliary magnetization portion 30c. The upper auxiliary magnetization portion 30c includes an upper auxiliary yoke portion (second yoke portion) 42 made of a magnetic metal, and a magnetizing upper auxiliary coil (magnetization coil, second magnetization coil) 43. The upper auxiliary yoke portion 42 has a configuration symmetrical with the lower auxiliary yoke portion 34 in the vertical direction, and includes eight upper connecting portions 42a corresponding to the respective magnetizing opposing projections 32a, and one upper joining portion 42b that joins the upper connecting portions 42a together. A first end of each upper connecting portion 42a is configured to be able to abut the top of the annular connecting portion 32b of the outer circumferential side main yoke portion 32. The upper connecting portion 42a extends on the upper side of the main magnetization coil 33 and the like as viewed in the axial direction without interference therewith, and a second end of each upper connecting portion 42a is integrally connected to the upper joining portion 42b. In the upper auxiliary yoke portion 42, the upper connecting portions 42a are integrally connected to the upper joining portion 42b.

The upper joining portion 42b is located on the upper side of the rotor 20 installed in the magnetizer 30, and has a columnar shape extending in the axial direction of the rotor 20. The upper joining portion 42b has an abutment portion 42c located in the center portion of the underside and configured to abut the rotor 20, and an upper insertion projection (insertion part, insertion projection) 42d located inside the abutment portion 42c and configured to be inserted from above into the shaft insertion hole 22b in the center portion of the rotor 20.

Further, the magnetizing upper auxiliary coil 43 is wound around the upper joining portion 42b with a winding axis oriented in the axial direction. An upper first regulation member (regulation member) 44 having a tubular shape made of a non-magnetic metal is mounted on the outer peripheral side of the magnetizing upper auxiliary coil 43, and an upper second regulation member (regulation member) 45 having a plate shape made of a non-magnetic metal is provided on the lower side in the axial direction of the magnetizing upper auxiliary coil 43. The upper second regulation member 45 is fixed to the upper joining portion 42b or the like. The lower surfaces of the upper second regulation member 45 and the abutment portion 42c may be, for example, flush with each other. The regulation members 44 and 45 may be made of, for example, SUS. The regulation members 44 and 45 are provided to reduce bulging or displacement in winding of the magnetizing upper auxiliary coil 43 during energization in magnetization. Further, the upper second regulation member 45 can also reduce displacement in winding of the magnetizing upper auxiliary coil 43 due to its weight.

In the magnetizer 30 of the present embodiment, the main magnetization portion 30a performs magnetization by applying a magnetizing magnetic flux between the magnetizing opposing projections 32a adjacent to each other in the circumferential direction through inside the rotor 20. In addition, the main magnetization portion 30a cooperates with each of the auxiliary magnetization portions 30b and 30c to forcibly apply a magnetizing magnetic flux to the inner circumferential side of the rotor 20 where the magnetic flux is difficult to reach only by the main magnetization portion 30a. That is, the magnetizer 30 of the present embodiment is configured to effectively magnetize a portion of the permanent magnet 23, in particular, the bent portion 23b and the vicinity of the bent portion 23b, which are radially inwardly separated from the main magnetization portion 30a.

[Method of Magnetizing Permanent Magnets Using Magnetizer]

In use of the magnetizer 30 having the above configuration, the rotor 20 having unmagnetized permanent magnets 23 is first installed in the magnetizer 30. In the rotor 20 to be magnetized, the rotary shaft 21 is not yet inserted, and the shaft insertion hole 22b is in an open state.

As shown in FIG. 6, while the magnetizer upper portion 41 is above and separated from the magnetizer main body 31, the rotor 20 having unmagnetized permanents magnets 23 is placed on the top of the lower joining portion 34b of the magnetizer main body 31. Accordingly, the lower insertion projection 34d is inserted into the shaft insertion hole 22b of the rotor 20. When the rotor 20 is installed in the magnetizer main body 31, the magnetizer upper portion 41 is lowered in the axial direction, whereby the upper insertion projection 42d is inserted into the shaft insertion hole 22b of the rotor 20 as shown in FIGS. 4 and 5. The magnetizer upper portion 41 is lowered until the first end of the upper connecting portion 42a of the upper auxiliary yoke portion 42 abuts the top of the outer circumferential side main yoke portion 32. That is, the upper auxiliary yoke portion 42 and the outer circumferential side main yoke portion 32 are magnetically connected, so that a magnetizing magnetic flux sufficiently flows between the upper auxiliary yoke portion 42 and the outer circumferential side main yoke portion 32.

Then, the unmagnetized permanent magnets 23 of the rotor 20 are magnetized. In the present embodiment, magnetization is performed in two steps, for example, S-pole magnetization first, and then N-pole magnetization. The above order of magnetization is merely an example, and the order may be reversed.

Figure 7:
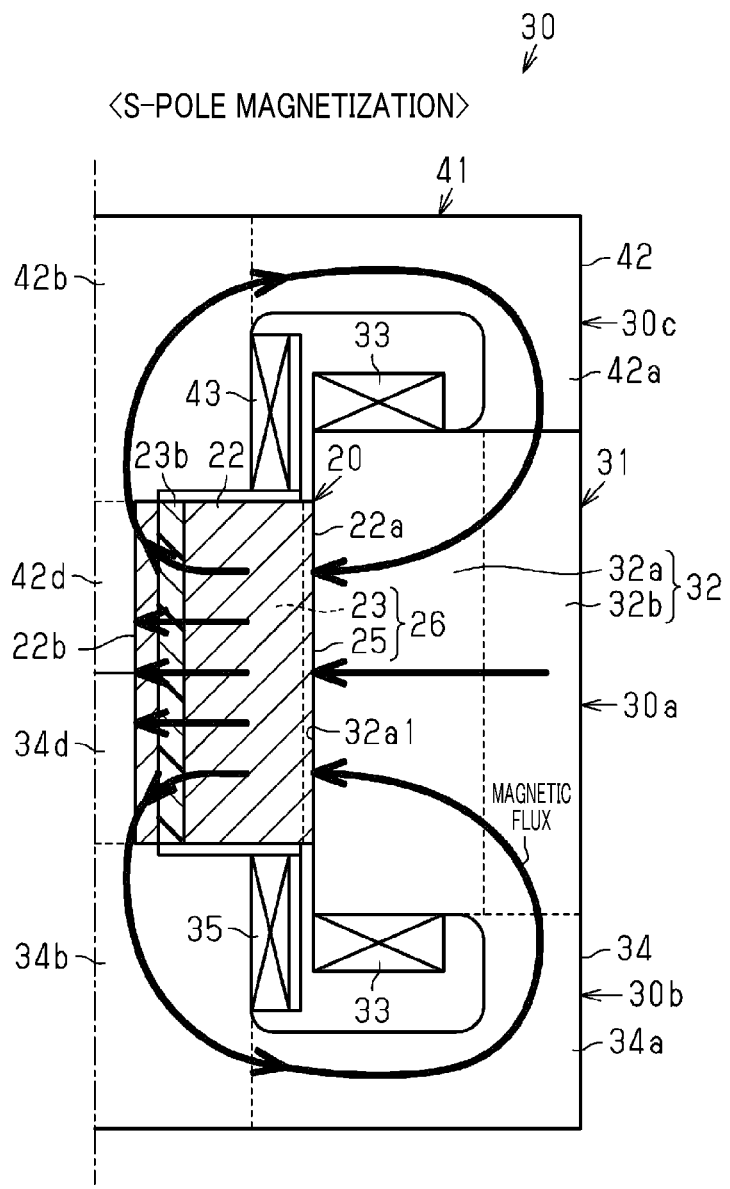
FIG. 7 is an explanatory view for explaining a magnetization method of the magnetizer of FIG. 4.

In S-pole magnetization, among eight unmagnetized permanent magnets 23 disposed in the circumferential direction of the rotor 20, every other permanent magnet 23 to be magnetized to be an S-pole undergoes S-pole magnetization. That is, the main magnetization coils 33 and the auxiliary coils 35 and 43 mounted on every other magnetizing opposing projections 32a to be magnetized to an S-pole disposed in the circumferential direction are energized for S-pole magnetization by a magnetization controller 50 shown in FIG. 5. Accordingly, as shown in FIG. 7, a magnetizing magnetic flux is applied through the rotor 20 from the respective magnetizing opposing projections 32a of the outer circumferential side main yoke portions 32 toward the respective insertion projections 34d and 42d of the auxiliary yoke portions 34 and 42.

In this process, the magnetizing opposing projection 32a and the insertion projections 34d and 42d each magnetically connected to the magnetizing opposing projection 32a are located outside and inside the rotor 20 and radially opposed to each other. This increases the magnetizing magnetic flux penetrating through the rotor 20 across the entirety from radially outside to inside the rotor 20. Further, due to the auxiliary coils 35 and 43 being provided to cooperate with the main magnetization coil 33, a magnetizing magnetic flux can be further forced to flow so that a desired flow of magnetic flux can be effectively maintained.

Figure 8:
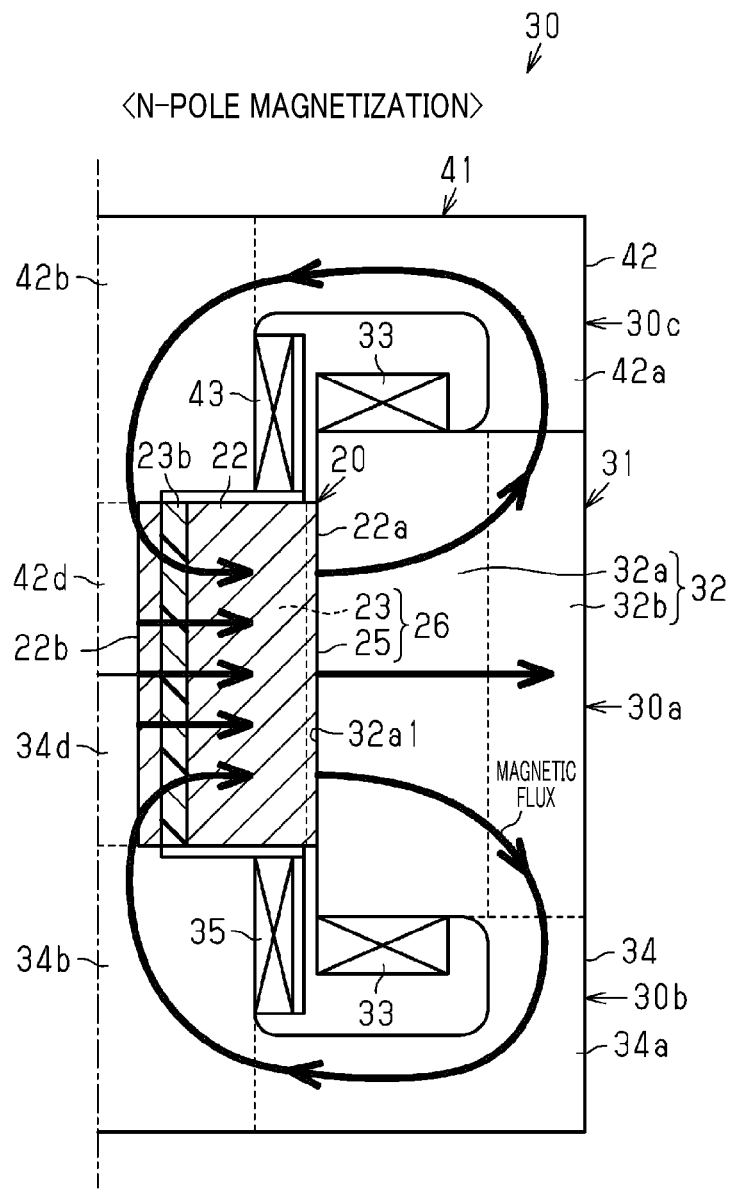
FIG. 8 is an explanatory view for explaining a magnetization method of the magnetizer of FIG. 4.

In N-pole magnetization, the every other remaining permanent magnet 23 to be magnetized to an N-pole in the rotor 20 is magnetized. That is, the main magnetization coils 33 and the auxiliary coils 35 and 43 mounted on every other magnetizing opposing projections 32a to be magnetized to an N-pole disposed in the circumferential direction are energized for N-pole magnetization in a direction opposite to the case of S-pole magnetization by the magnetization controller 50. Accordingly, as shown in FIG. 8, a magnetizing magnetic flux is applied through the rotor 20 from the respective insertion projections 34d and 42d of the auxiliary yoke portions 34 and 42 toward the respective magnetizing opposing projections 32a of the outer circumferential side main yoke portions 32 in a direction opposite to the case of S-pole magnetization.

Also in the case of N-pole magnetization, the magnetizing opposing projection 32a and the insertion projections 34d and 42d each magnetically connected to the magnetizing opposing projection 32a are located outside and inside the rotor 20 and radially opposed to each other. This increases the magnetizing magnetic flux penetrating through the rotor 20 across the entirety from radially outside to inside the rotor 20. Further, due to the auxiliary coils 35 and 43 being provided and energized together with the main magnetization coil 33, a magnetizing magnetic flux for N-pole magnetization can also be further forced to flow so that a desired flow of magnetic flux can be effectively maintained.

Therefore, as in the present embodiment in which the permanent magnet 23 has a substantially V-shaped bent-back shape, even in a bent-back shape in which the bent portion 23b as a bent-back portion is located radially inward, the bent portion 23b and the vicinity of the bent portion 23b, which are separated from the main magnetization portion 30a can be effectively magnetized. This is particularly effective when a deeply bent-back shape in which the embedding depth Lm is larger than the magnetic pole pitch Lp is used, as in the permanent magnet 23 of the present embodiment.

In the conventional configuration in which magnetization is performed only with the main magnetization portion 30a on the outer circumferential side without using the auxiliary magnetization portions 30b and 30c, a force of forcibly applying the magnetizing magnetic flux to the radially inside of the rotor 20 decreases, which causes a magnetic force in the bent portion 23b and the vicinity of the bent portion 23b of the permanent magnet 23 to be reduced. In particular, when a deeply bent-back shape such as the permanent magnet 23 of the present embodiment is adopted, the magnetic force in the bent portion 23b and the vicinity of the bent portion 23b is inferred to be further reduced.

Figure 9:
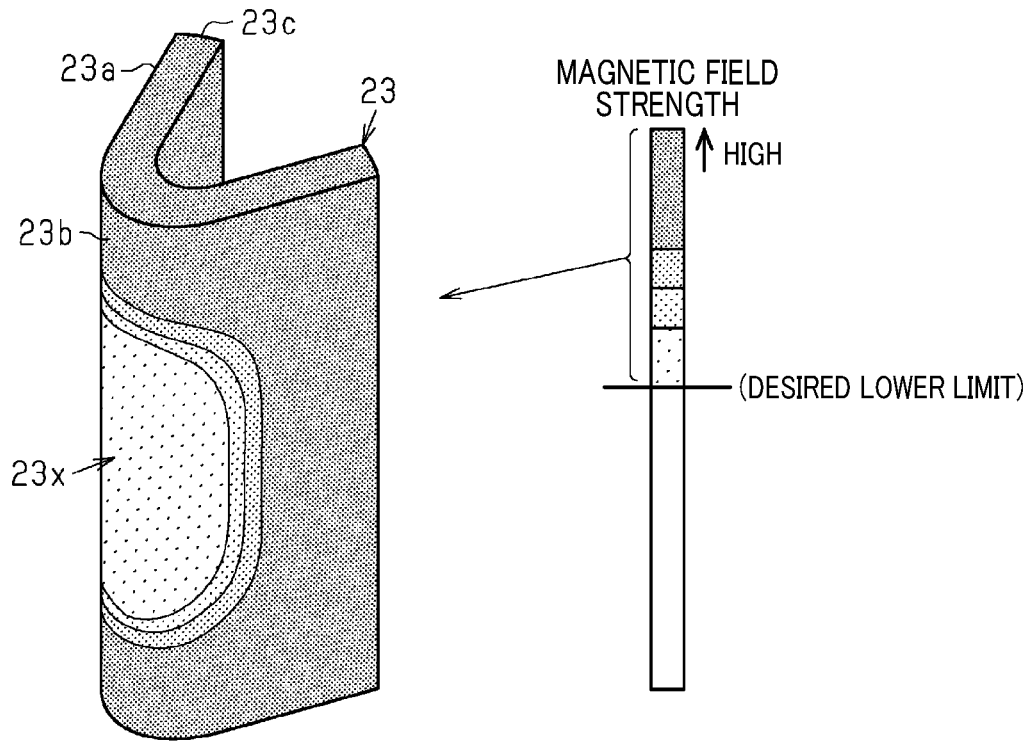
FIG. 9 is an explanatory view for explaining a permanent magnet magnetized by the magnetizer of FIG. 4.
Figure 10:
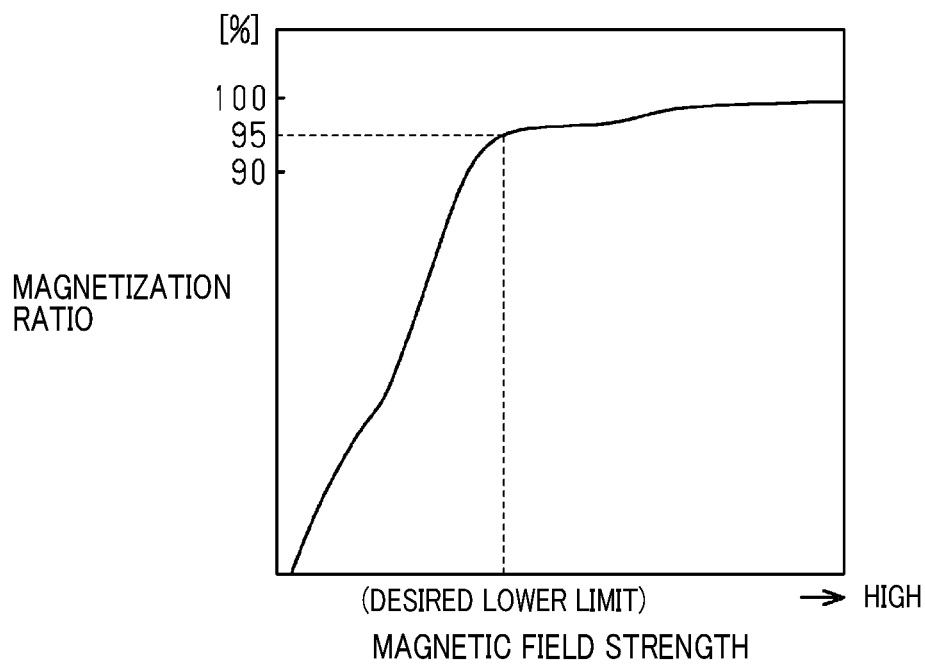
FIG. 10 is an explanatory view for explaining a permanent magnet magnetized by the magnetizer of FIG. 4.

As shown in FIG. 9, when the bent portion 23b of the permanent magnet 23 located radially inside the rotor 20 in side view of the permanent magnet 23 is taken as a rectangular shape elongated in the axial direction, the magnetic force tends to be lowest in a center portion 23x in the vertical direction of the rectangular shape. On the other hand, according to the magnetization method of the present embodiment, the center portion 23x in the vertical direction can be magnetized at a magnetic field strength exceeding a desired lower limit. In the bent portion 23b, regions above and below the center portion 23x in the vertical direction can be magnetized at a more sufficient magnetic field strength than the center portion 23x. Further, as shown in FIG. 10, when an inflection point at which a change in magnetic field strength due to magnetization of the permanent magnet 23 becomes gradual is defined as a desired lower limit, a region magnetized at a magnetic field strength exceeding the desired lower limit is more than 90%, and approximately 95%, whereby the entire permanent magnet 23 can be magnetized with a sufficient magnetic force.

The effects of the present embodiment will be described.

(1) When magnetization of the permanent magnets 23 embedded in the rotor 20 is performed from outside the rotor 20 using the magnetizer 30 of the present embodiment, magnetization is performed by applying a magnetizing magnetic flux through the rotor 20 between the magnetizing opposing projection 32a of the outer circumferential side main yoke portion 32 and the insertion projections 34d and 42d of the auxiliary yoke portions 34 and 42, which are located opposed to each other in the radial direction of the rotor 20, while the insertion projections 34d and 42d are inserted in the shaft insertion hole 22b before the rotary shaft 21 is inserted. That is, particularly in the permanent magnet 23 having a bent-back shape protruding radially inward as in the present embodiment, the bent portion 23b and the vicinity of the bent portion 23b are located at positions that are difficult to reach with a magnetizing magnetic flux in conventional magnetization performed from the outer circumferential side. According to the magnetization method of the present embodiment, a sufficient magnetizing magnetic flux can be supplied to the bent portion 23b and the vicinity of the bent portion 23b of the permanent magnet 23. Accordingly, the entire permanent magnet 23 can be magnetized with a sufficient magnetic force.

(2) The main magnetization coil 33 wound around the opposing portion of the outer circumferential side main yoke portion 32 cooperates with each of the auxiliary coils 35 and 43 wound around the joining portions 34b and 42b adjacent to the insertion projections 34d and 42d of the auxiliary yoke portions 34 and 42, respectively, to supply a magnetizing magnetic flux. That is, by exciting the auxiliary coils 35 and 43 located close to the bent portion 23b of the permanent magnet 23, it is possible to effectively maintain sufficient supply of a magnetizing magnetic flux to the bent portion 23b and the vicinity of the bent portion 23b of the permanent magnet 23. Accordingly, the entire permanent magnet 23 can be more reliably magnetized with a sufficient magnetic force.

(3) The magnetizing auxiliary coils 35 and 43 are provided in common to different poles of the rotor magnetic pole portions 26 including the permanent magnets 23, and the direction of the magnetizing magnetic flux is switched by switching an energization mode for each pole of the permanent magnet 23 to be magnetized. Accordingly, the number of the auxiliary coils 35 and 43 in the magnetizer 30 can be minimized. Further, since the insertion projections 34d and 42d inserted into the shaft insertion hole 22b of the rotor 20 are shared, the insertion projections 34d and 42d can be sized to be as large as possible in the shaft insertion hole 22b, minimizing the magnetic resistance.

(4) The upper auxiliary yoke portion 42 and the magnetizing upper auxiliary coil 43 are located symmetrically with the lower auxiliary yoke portion 34 and the magnetizing lower auxiliary coil 35, respectively, on opposing sides (in the present embodiment, upper side and lower side) in the axial direction of the rotor 20 to be magnetized. Accordingly, a magnetizing magnetic flux symmetrical in the axial direction of the rotor 20 can be supplied to perform magnetization in a well-balanced manner in the axial direction of the permanent magnet 23.

(5) The permanent magnet 23 of the present embodiment has a bent-back shape in which the embedding depth Lm is larger than the magnetic pole pitch Lp. When an inflection point at which a change in magnetic field strength due to magnetization of the permanent magnet 23 becomes gradual is defined as a desired lower limit, a region magnetized at a magnetic field strength exceeding the desired lower limit can be more than 90%. That is, even when magnetization is performed from outside the rotor 20, the rotor 20 having the permanent magnet 23 including the bent portion 23b magnetized with a high magnetic force can be provided.

The present embodiment can be modified and implemented as follows. The present embodiment and the following modifications can be implemented in combination with each other as long as no technical contradiction occurs.

As indicated by the dotted line and reference numbers in parentheses in FIG. 6, tapered portions 34x and 42x may be formed on the end portions of the insertion projections 34d and 42d of the auxiliary yoke portions 34 and 42, respectively, to provide the insertion projections 34d and 42d with a tapered shape. Accordingly, the insertion projections 34d and 42d can be easily inserted into the shaft insertion hole 22b of the rotor 20 to be magnetized. Further, a tapered portion 22x may be formed to provide an enlarged opening of the shaft insertion hole 22b of the rotor 20, so that the insertion projections 34d and 42d can be easily inserted into the shaft insertion hole 22b.

Figure 12:
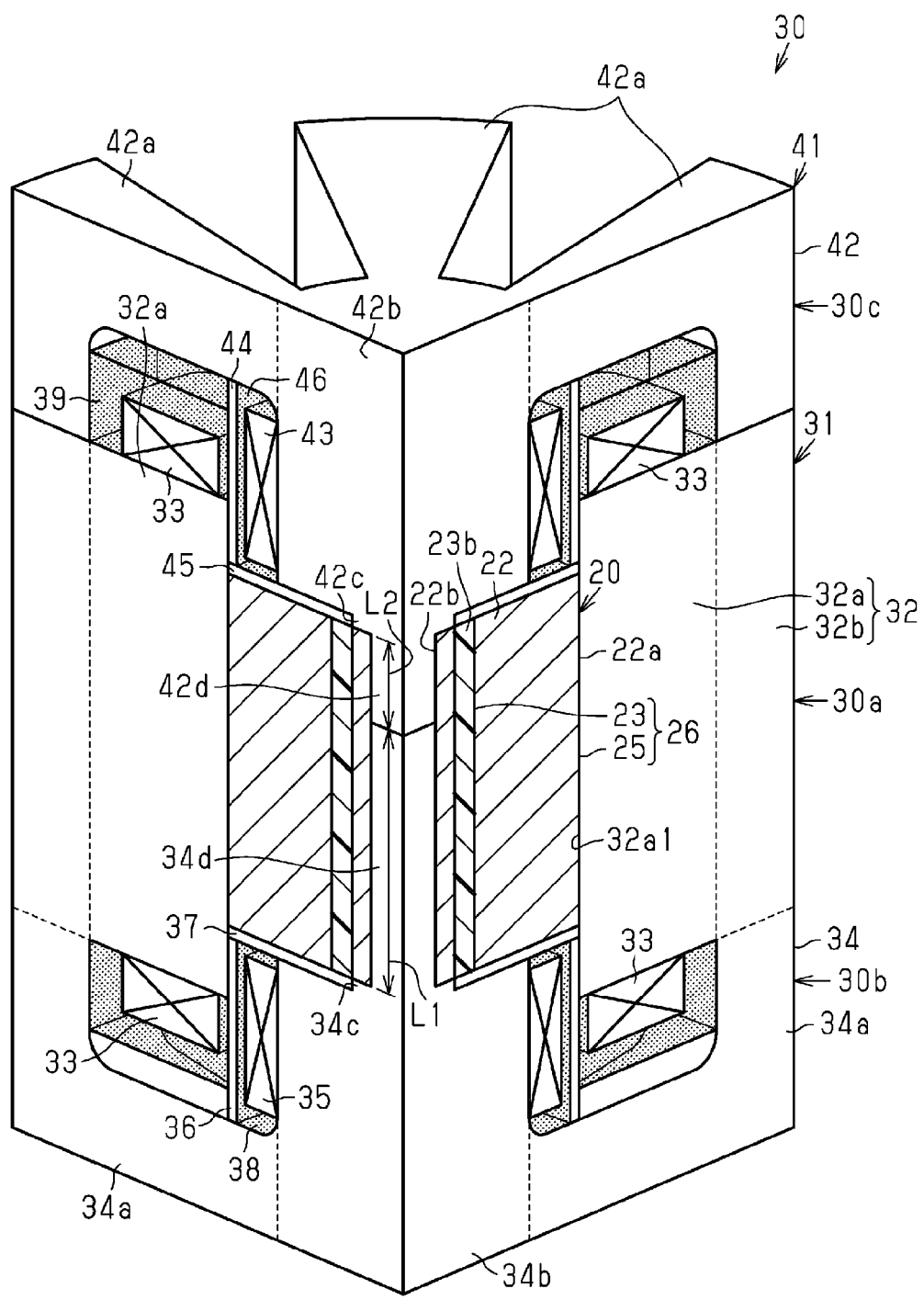
FIG. 12 is an explanatory view for explaining a configuration of a magnetizer according to another modification.

The insertion projections 34d and 42d of the auxiliary yoke portions 34 and 42, respectively, have the same shape. However, the insertion projections 34d and 42d may have different projection lengths. For example, as shown in FIG. 12, a projection length L1 of the lower insertion projection 34d may be larger than a projection length L2 of the upper insertion projection 42d so that the rotor 20 can be more stably installed when supported by the lower insertion projection 34d during magnetization. In other words, in a configuration in which the magnetizer upper portion 41 as a movable portion is movable relative to the magnetizer main body 31 as a stationary portion, when the projection length L2 of the upper insertion projection 42d is smaller than the projection length L1 of the lower insertion projection 34d, the upper insertion projection 42d is less likely to come into contact with peripheral members, improving the movability of the magnetizer upper portion 41. Further, the projection length L2 of the upper insertion projection 42d may be 0, that is, only the lower insertion projection 34d may be provided, so that the lower insertion projection 34d extends through the entirety of the rotor 20 in the axial direction. Alternatively, only the upper insertion projection 42d may be provided.

Figure 11:
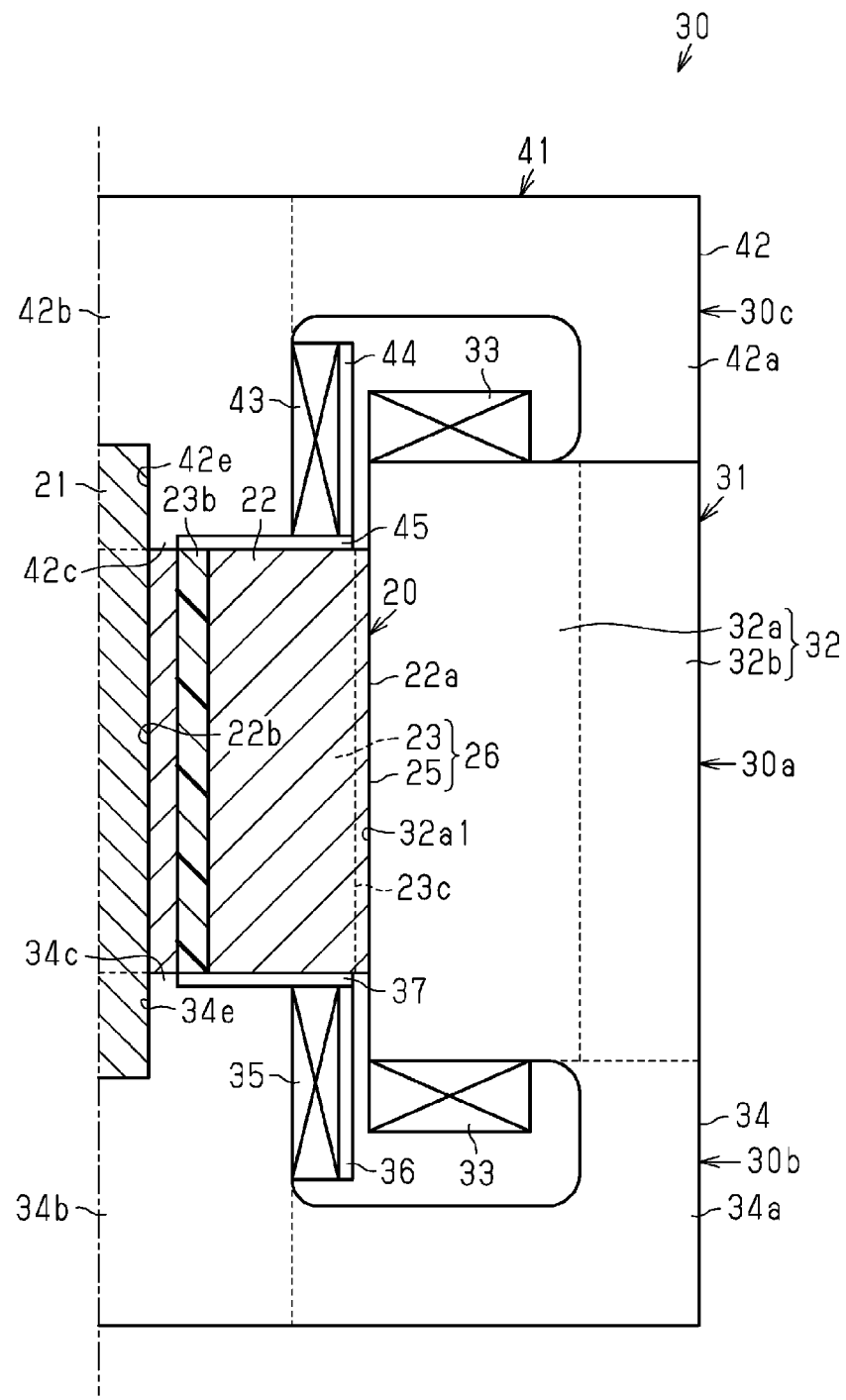
FIG. 11 is an explanatory view for explaining a configuration of a magnetizer according to a modification.

In magnetization, the insertion projections 34d and 42d provided in the auxiliary yoke portions 34 and 42, respectively, are inserted into the shaft insertion hole 22b of the rotor 20 before the rotary shaft 21 is inserted. However, as shown in FIG. 11, for example, magnetization of the permanent magnet 23 may also be performed in the state in which the rotary shaft 21 is mounted in the rotor 20 by using the rotary shaft 21 itself inserted in the shaft insertion hole 22b of the rotor 20 as part of the magnetic path. In this modification, a lower connection recess (connection part) 34e is provided in the lower joining portion 34b of the lower auxiliary yoke portion 34, and an upper connection recess (connection part) 42e is provided in the upper joining portion 42b of the upper auxiliary yoke portion 42. An upper end and a lower end of the rotary shaft 21 that has been mounted in the rotor 20 to be magnetized are inserted and magnetically connected to the connection recesses 34e and 42e. Then, a magnetizing magnetic flux is applied between the magnetizing opposing projection 32a of the outer circumferential side main yoke portion 32 and the rotary shaft 21, which are opposed to each other in the radial direction of the rotor 20, to magnetize the permanent magnet 23. This modification is applicable when the rotary shaft 21 is made of magnetic metal.

The deformation and displacement of the magnetizing auxiliary coils 35 and 43 are regulated by the regulation members 36, 37, 44 and 45 made of non-magnetic metal provided around the magnetizing auxiliary coils 35 and 43, but the regulation mode is not limited thereto. For example, as shown in FIG. 12, coil holding portions (regulation member) 38 and 46 that regulate deformation and displacement of the magnetizing auxiliary coils 35 and 43 may be formed by covering the magnetizing auxiliary coils 35 and 43 with a thermosetting resin such as epoxy resin, and curing the resin. In this configuration as well, deformation and displacement in winding of the magnetizing auxiliary coils 35 and 43 during energization can be reduced. Further, as the area in which the resin of the coil holding portions 38 and 46 is in contact with the magnetizing auxiliary coils 35 and 43 increases, heat from the magnetizing auxiliary coils 35 and 43 is expected to be effectively absorbed by the coil holding portions 38 and 46.

In FIG. 12, the regulation members 36, 37, 44 and 45 are provided on the outer side of the coil holding portions 38 and 46 so that deformation and displacement of the magnetizing auxiliary coils 35 and 43 can be more reliably regulated. Further, when the regulation members 36, 37, 44 and 45 are mounted, a concern that the regulation members 36, 37, 44 and 45 made of metal may come into contact with and damage the magnetizing auxiliary coils 35 and 43 can be reduced since the coil holding portions 38 and 46 cover the magnetizing auxiliary coils 35 and 43, respectively. When the coil holding portions 38 and 46 are provided, any of the regulation members 36, 37, 44 and 45 or all the regulation members 36, 37, 44 and 45 may be omitted.

Further, not only for the magnetizing auxiliary coils 35 and 43, but also for the main magnetization coil 33, a coil holding portion (regulation member) 39 that regulates deformation and displacement of the main magnetization coil 33 may be formed by covering the main magnetization coil 33 with a thermosetting resin such as epoxy resin, and curing the resin. With this configuration, deformation and displacement in winding of the main magnetization coil 33 can be reduced.

The upper auxiliary yoke portion 42 and the magnetizing upper auxiliary coil 43 are located symmetrically with the lower auxiliary yoke portion 34 and the magnetizing lower auxiliary coil 35, respectively, on opposing sides in the axial direction of the rotor 20 to be magnetized. However, they may be provided only on one side in the axial direction. In this case, as described above, it is preferred that the insertion projection 34d or 42d is provided to extend through the entirety of the rotor 20 in the axial direction.

The main magnetization coil 33 is provided on the opposing projection 32a of the outer circumferential side main yoke portion 32, and the magnetizing auxiliary coils 35 and 43 are provided on the joining portions 34b and 42b of the magnetizing auxiliary yoke portions 34 and 42, respectively. However, the manner in which the magnetizing coils are provided is not limited the above configuration. For example, the auxiliary coils 35 and 43 may be wound around the connecting portions 34a and 42a of the auxiliary yoke portions 34 and 42, respectively. In this case, although the joining portions 34b and 42b and the insertion projections 34d and 42d may be shared as in the above embodiment, the magnetic paths from the connecting portions 34a and 42a to the insertion projections 34d and 42d, respectively, may be independent. The position where the main coil 33 is provided may be appropriately modified to a position other than the opposing projection 32a. Further, the magnetization coil may be shared, without separately providing the main coil 33 and the auxiliary coils 35 and 43.

Figure 13:
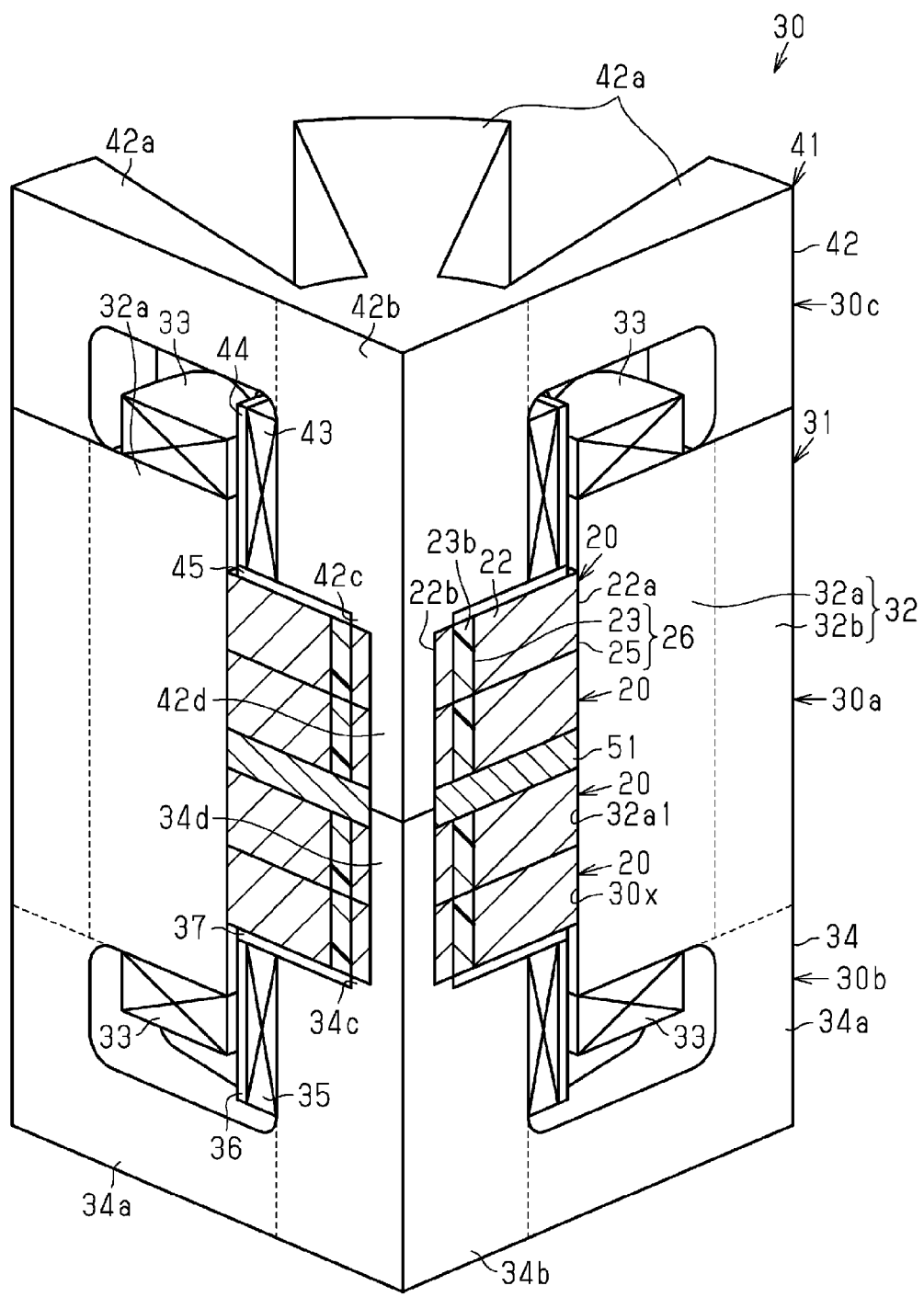
FIG. 13 is an explanatory view for explaining a configuration and a magnetization method of a magnetizer according to another modification.

Although a single rotor 20 is magnetized as shown in FIG. 4 and the like, a plurality of rotors 20 may be simultaneously magnetized. For example, as shown in FIG. 13, four rotors 20 can be stacked in the axial direction to magnetize the four rotors 20 simultaneously. By magnetizing a plurality of rotors 20 simultaneously, the productivity of the rotors 20 can be improved.

For example, as shown in FIG. 13, depending on the axial length or the number of rotors 20 to be magnetized, a gap may be formed in an axial direction when the rotors 20 are installed in a rotor installation space 30x between the magnetizer main body 31 and the magnetizer upper portion 41 of the magnetizer 30. In this case, a spacer 51 is provided to fill the gap. In FIG. 13, a spacer 51 is provided while two rotors 20 are on each side. The spacer 51 is preferably made of the same magnetic metal material as that of the rotor core 22 from the perspective of reducing the influence on a flow of magnetizing magnetic flux, but other magnetic metal materials may also be used.

FIG. 9 shows the distribution of magnetic force of the permanent magnet 23 when a single rotor 20 is magnetized with the magnetizer 30 described above. Although a good magnetic force is obtained across the entire permanent magnet 23, the center portion 23x in the vertical direction is magnetized with a magnetic force slightly lower than in the other portions. That is, since a magnetic force is slightly lower in a center portion of the magnetizer 30 in the vertical direction, the spacer 51 can be positioned at the center position to perform efficient magnetization by reducing a difference in magnetic force among a plurality of rotors 20.

The position where the spacer 51 is provided may be appropriately modified. For example, the spacer 51 may be positioned at the bottom of the rotors 20. In this case, only the rotor 20 to be magnetized can be attached or detached to and from the magnetizer 30 at each time of magnetization of the rotor 20, and the spacer 51 can remain positioned in the magnetizer 30. Further, the above spacer 51 is used to fill the gap in the axial direction in the rotor installation space 30x.

However, depending on the size of the outer diameter of the rotor 20 or the size of the inner diameter of the shaft insertion hole 22*b*, a spacer (not shown) made of magnetic metal that fills a gap in the radial direction may also be used. That is, a spacer made of magnetic metal may be used to fill a gap in the axial direction or the radial direction depending on the size or number of the rotors 20 to be magnetized in the rotor installation space 30*x*. Further, magnetization of the rotor 20 may also be performed in a state in which a gap is formed in the rotor installation space 30*x* without using such a spacer.

The magnetizer 30 is configured with the magnetizer main body 31 and the magnetizer upper portion 41 provided on the upper side thereof, but the configuration of the magnetizer 30 is not limited thereto. For example, the magnetizer main body 31 and the magnetizer upper portion 41 may be arranged side by side in a direction other than the vertical direction, such as an inclined direction or a horizontal direction.

The shape of the permanent magnet 23 shown in FIG. 2, FIG. 9, and the like is an example, and may be modified as appropriate.

The configuration of the rotary electric machine M shown in FIG. 1 and the like is an example, and may be modified as appropriate.

Technical idea derived from the above embodiment and modifications will be described.

(A) A method of manufacturing a rotor, wherein the insertion projection which is the insertion part of the second yoke portion is configured to be inserted into the shaft insertion hole of the rotor in magnetization of the permanent magnet, and a tapered portion (22*x*) is formed to provide an enlarged opening of the shaft insertion hole.

Although the present disclosure has been described in accordance with the examples, the present disclosure should not be construed as limited to those examples or structures. The present disclosure encompasses various modifications and equivalent alterations. In addition, various combinations and configurations thereof, as well as other combinations and configurations including more, less or only a single element, are also within the scope and spirit of the present disclosure.

What is claimed is:

1. An apparatus for manufacturing a rotor, the apparatus comprising:
    a magnetizer configured to magnetize a permanent magnet in a rotor from outside the rotor, wherein
    the rotor includes a rotor core having a magnet insertion hole,
    the permanent magnet is provided in an embedded state in the magnet insertion hole and has a bent-back shape protruding radially inward,
    the magnetizer includes:
        a first yoke portion having an opposing portion facing an outer peripheral surface of the rotor;
        a second yoke portion forming a magnetic path together with the first yoke portion, the second yoke portion including an insertion part or a connection part, the insertion part being configured to be inserted into a shaft insertion hole of the rotor before a rotary shaft is inserted, the connection part being configured to be magnetically connected to the rotary shaft inserted in the shaft insertion hole of the rotor; and
        a magnetization coil disposed on the magnetic path of the first and second yoke portions, and
    the magnetizer is configured to magnetize the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

2. The apparatus for manufacturing a rotor according to claim 1, wherein
    the magnetization coil includes a first magnetization coil wound around the opposing portion of the first yoke portion, and a second magnetization coil wound around a vicinity of the insertion part or the connection part of the second yoke portion, and
    the first and second magnetization coils in the magnetization coil are configured to cooperate with each other to generate a magnetizing magnetic flux.

3. The apparatus for manufacturing a rotor according to claim 2, wherein
    a plurality of the first magnetization coils are provided in a circumferential direction of the rotor, corresponding to rotor magnetic pole portions each including the permanent magnet, while the second magnetization coil is provided in common to different poles of the rotor magnetic pole portions, and
    the second magnetization coil is configured to switch a direction of a magnetizing magnetic flux by switching an energization mode for each pole of the permanent magnet to be magnetized.

4. The apparatus for manufacturing a rotor according to claim 2, wherein
    each of the second yoke portions and the second magnetization coils are located symmetrically with the other of the second yoke portions and the second magnetization coils, respectively, on opposing sides in an axial direction of the rotor to be magnetized.

5. The apparatus for manufacturing a rotor according to claim 1, wherein
    an insertion projection which is the insertion part of the second yoke portion has a tapered portion at an end portion to provide a tapered shape.

6. The apparatus for manufacturing a rotor according to claim 1, wherein
    the insertion projection which is the insertion part of the second yoke portion is provided in each of a movable portion and a stationary portion of the magnetizer, and
    a projection length of the insertion projection provided in the movable portion is smaller than a projection length of the insertion projection provided in the stationary portion.

7. The apparatus for manufacturing a rotor according to claim 1, wherein
    the magnetizer includes a spacer made of a magnetic material that fills a gap formed by the rotor to be magnetized when the rotor is installed in a rotor installation space.

8. The apparatus for manufacturing a rotor according to claim 1, wherein
    the magnetizer includes a regulation member that regulates deformation and displacement of the magnetization coil.

9. A method of manufacturing a rotor using a magnetizer, wherein
    the magnetizer is configured to magnetize a permanent magnet in a rotor from outside the rotor,
    the rotor includes a rotor core having a magnet insertion hole, the permanent magnet is provided in an embedded state in the magnet insertion hole and has a bent-back shape protruding radially inward, the magnetizer includes:
- a first yoke portion having an opposing portion facing an outer peripheral surface of the rotor;
- a second yoke portion forming a magnetic path together with the first yoke portion, the second yoke portion including an insertion part or a connection part, the insertion part being configured to be inserted into a shaft insertion hole of the rotor before a rotary shaft is inserted, and the connection part being configured to be magnetically connected to the rotary shaft inserted in the shaft insertion hole of the rotor; and
- a magnetization coil disposed on the magnetic path of the first and second yoke portions, the method comprising:

magnetizing the permanent magnet in an embedded state by energizing the magnetization coil to apply a magnetizing magnetic flux at least through the rotor between the opposing portion of the first yoke portion and the insertion part of the second yoke portion or the rotary shaft, which are located opposed to each other in a radial direction of the rotor.

10. A rotor comprising:
a rotor core having a magnet insertion hole; and
a permanent magnet provided in an embedded state in the magnet insertion hole and has a bent-back shape protruding radially inward, wherein the rotor is configured with the permanent magnet in the embedded state magnetized using a magnetizer from outside the rotor, assuming a length between positions where extension lines of inner sides of the bent-back shape of the permanent magnet intersect an outer peripheral surface of the rotor core is defined as a magnetic pole pitch, and a length from the outer peripheral surface of the rotor core to an inner side of the bent portion of the permanent magnet on a circumferential center line of the permanent magnet is defined as an embedding depth, the permanent magnet has a deep folded shape, in which the embedding depth is larger than the magnetic pole pitch, and when an inflection point at which a change in magnetic field strength due to magnetization of the permanent magnet becomes gradual is defined as a desired lower limit, the permanent magnet is magnetized such that a region of the permanent magnet magnetized at a magnetic field strength exceeding the desired lower limit is more than 90%.

* * * * *